Dec. 24, 1940.  L. W. GODDU  2,226,428
MEASURING DEVICE
Original Filed Sept. 9, 1935  2 Sheets-Sheet 1
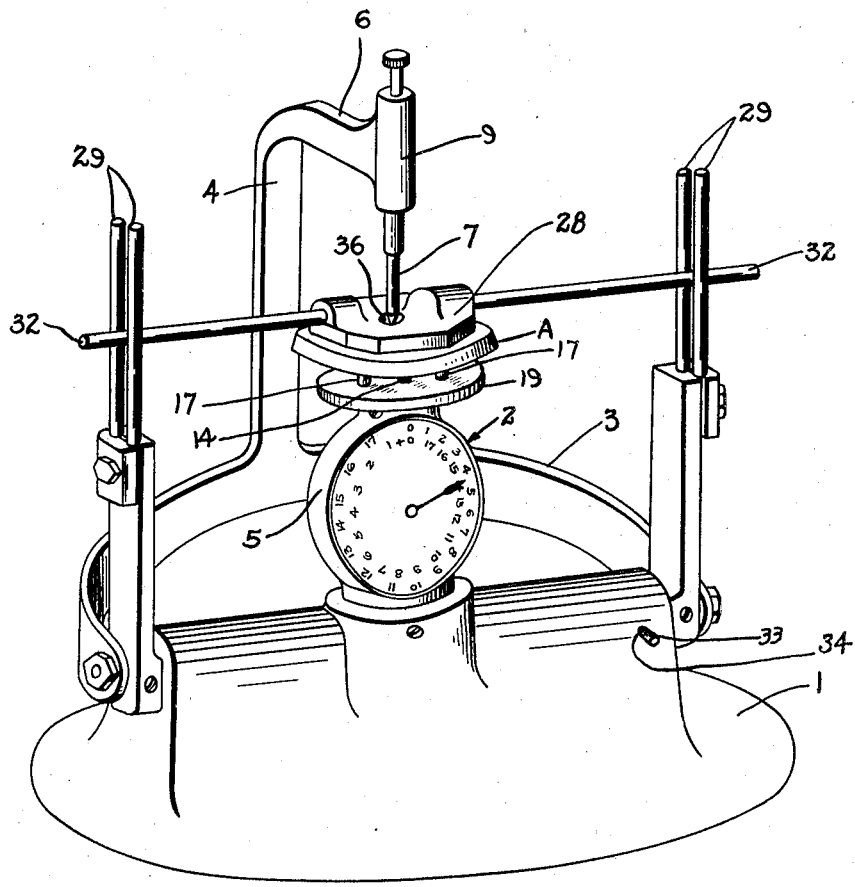
FIG. I
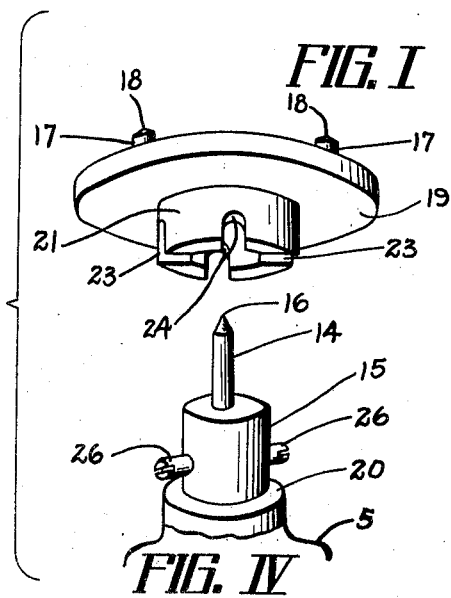
FIG. IV
INVENTOR
Lloyd W. Goddu
BY
Harry H. Styll.
ATTORNEY Dec. 24, 1940.   L. W. GODDU   2,226,428
MEASURING DEVICE
Original Filed Sept. 9, 1935   2 Sheets—Sheet 2
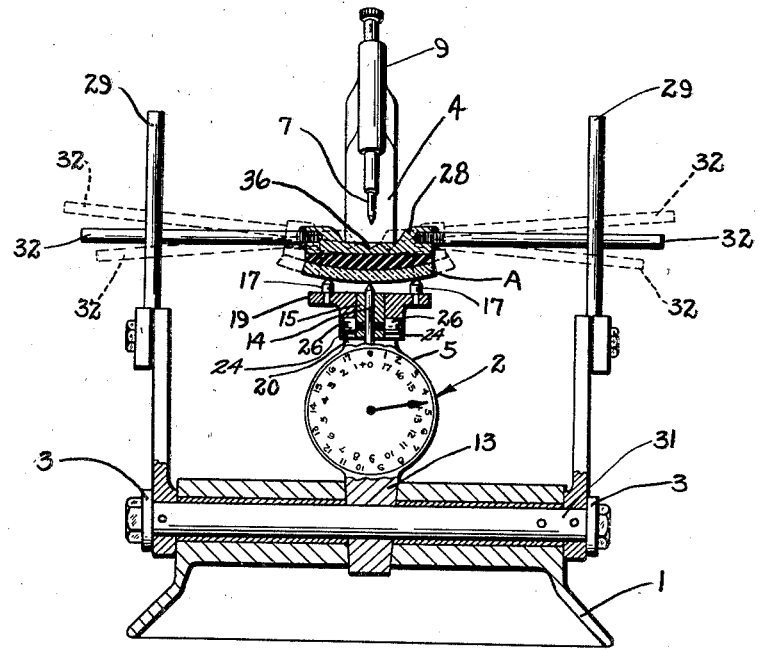
FIG. II
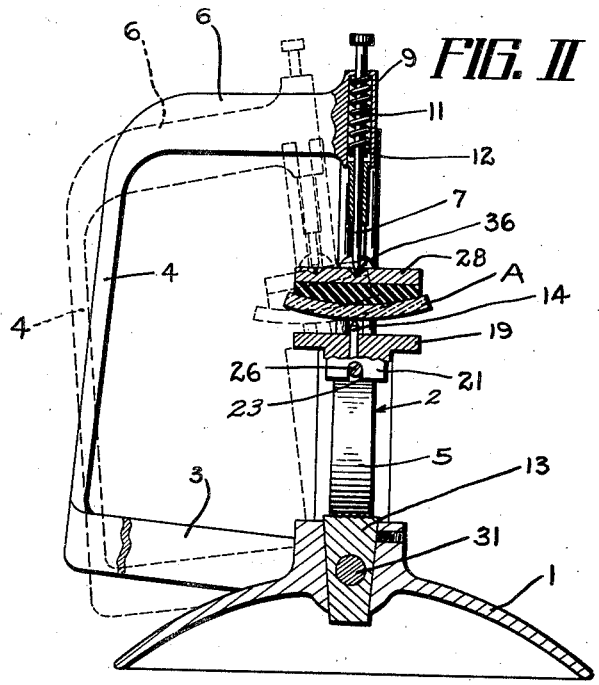
FIG. III
INVENTOR
Lloyd W. Goddu
BY
Harry H. Styll
ATTORNEY Patented Dec. 24, 1940

2,226,428

UNITED STATES PATENT OFFICE 2,226,428

MEASURING DEVICE

Lloyd W. Goddu, Southbridge, Mass., assignor to American Optical Company, Southbridge, Mass., a voluntary association of Massachusetts Application September 9, 1935, Serial No. 39,769
Renewed May 16, 1939

11 Claims. (Cl. 33—172)

This invention relates to an apparatus for measuring the curvature of surfaces and is more particularly concerned with an apparatus for determining the departure of the surfaces from the curvature desired on a finished lens.

Heretofore, in abrading lenses it has been usual to utilize an abrading tool having the desired curvature of the lens formed in the principal meridians thereof. The abrading action is obtained by the use of abrasives, such as emery or rouge. During the abrading operations the actual curvature formed on the lens departs from the theoretical curvature desired on the lens due to inaccuracies of the tool, uneven distribution of the abrasive or improper relative movement between the lens and the abrading tool.

In the past, usually no particular account has been taken of these departures because in most instances they were not considered great enough to substantially effect the desired optical properties of the finished lens. The present optical requirements in many ophthalmic lenses are such that such departures from the theoretical curvature may, under certain conditions, prove a very serious impairment to the vision and comfort of the patient wearing such a lens. Consequently, during the operation of forming the surface on the lens, the thickness and curvature should be checked frequently as the curve nears its final shape and the grinding apparatus is altered accordingly in order to produce the exact final curvature. In order to accurately check the curve during generation it is necessary that an extremely accurate means be provided to measure the departure of the surface from the final desired curvature. In checking the curvature of the lens surface being generated it is absolutely necessary that means be provided for fixing or predetermining the meridian in which the measurements are taken in order to know whether the curve is approaching the desired final curvature. To these ends, the attainments of the present invention are directed.

Accordingly, it is one of the major objects of this invention to provide a novel apparatus for measuring the degree of curvature of a lens in a predetermined meridian.

Another object of the present invention is to provide an apparatus for measuring and checking the curvature of lenses along two axes exactly at right angles to each other.

A further object is to provide an apparatus which is adapted to receive the lens holding block of an abrading machine on which the lens is held while being abraded so that the curvature of the lens surface may be measured and checked in meridians exactly on axis with the axes of the tool of the abrading machine.

Another object of the present invention is to provide a lens checking and measuring device of the type described, in which means is provided for simulating the operating position of the lens block relative to the lap in order to more accurately determine what adjustments of the apparatus are necessary in order to produce the final curve desired on the lens.

Other objects and advantages of the invention will become apparent from the following description taken in connection with the accompanying drawings and it will be apparent that many changes may be made in the details of construction, arrangement of parts shown and described without departing from the spirit of the invention as expressed in the accompanying claims. I, therefore, do not wish to be limited to the exact details shown and described as the preferred forms only have been shown in the way of illustration.

Referring to the drawings:

Fig. I is a perspective view of an apparatus utilizing an embodiment of the present invention;

Fig. II is a partial cross section front elevational view of Fig. I;

Fig. III is a partial cross section side elevational view of Fig. I; and

Fig. IV is a perspective view of the means for determining the axis along which the surface curvature is checked.

The present invention contemplates a device comprising a curve measuring instrument, which may be of any conventional form known to the prior art, and means for positively maintaining the lens to be tested on the axis which it is desired to measure. The apparatus is designed primarily for use in connection with an abrading apparatus during the surface abrading operation so that the lens block holder may be readily transferred from the abrading machine to the measuring device without removing the lens from the holder and in which the measurements will be taken exactly on the prescribed axes since the measuring apparatus will be held relative to the lens axis in a position similar to that the lens occupies relative to the tool while abrading.

The embodiment of the invention chosen for purposes of illustration comprises an apparatus having a base 1 which carries a lens curve measuring instrument 2 having scale and indicator means of conventional construction which will not be described in detail. A U-shaped frame 3 is pivotally connected to the base 1 and has an upwardly extending arm 4 having an upper forwardly extending portion 6 carrying a centering pin 7. The centering pin 7 is mounted for sliding movement in a bore of a boss 9 carried by the portion 6 and is resiliently urged toward its lowermost position by means of a spring 11 adapted to engage a washer and pin assembly 12 on the pin 7.

The curve measuring instrument 2 is mounted in a convenient case 5 having a depending foot 13 snugly fitted into the upper end of the base 1 and carries a suitable post 15, through which extends a suitable indicator actuating plunger 14 terminating in a point surface 16; the movement of said plunger being indicated by the scale and indicator means of the instrument.

For the purpose of positively and accurately determining the meridian in which the curve of the lens A is being measured, suitable pins 17 having point surfaces 18 are carried on a platform 19 in such a relation to the plunger 14 that the movement of the plunger 14 relative to the points 18 will cause the instrument to indicate the curve of the lens in one meridian when the lens is held against the points and slid from side to side. The movement of the indicator means during the movement of the lens over the points will indicate the difference in curvature of the lens along various points on the meridian being measured.

The platform 19 has a sleeve 21 adapted to fit over the post 15 and rest on a boss 20 on the casing 5. In order to hold the platform 19 and pins 17 in predetermined fixed positions, the lower end of the sleeve 21 has two pairs of diametrically opposed notches 23 and 24, which are adapted to engage opposed pins 26 extending transversely from the post 15. The axes of the notches 23 are in a common plane with the axis of the sleeve 21 and the axes of the pins 17. When the platform is in the position shown in Fig. II, the axes of the plunger 14 and the pins 17 lie on a straight line transversely of the platform and the notches 23 provide means for holding the plunger and pins in adjusted position in one meridian and the notches 24 function similarly to hold the plunger and pins in an adjusted position at right angles to the first position.

In order to fix the meridian of the lens being measured with respect to the points 16 and 18, means are provided for maintaining the axis of a lens block 28 of an abrading apparatus to which the lens A is secured in any suitable manner, against torsional movement about an axis normal to the lens surface. To this end, diametrically opposed, parallel, spaced upright arms 29, are fixed on a shaft 31 journalled in the base 1. The lens block 28 has outwardly extending opposed arms 32, which are adapted to be engaged between the arms 29 to maintain the arms 32 in a plane always parallel to themselves. The arms 29 are arranged in a manner substantially identical with the guiding arms of the abrading apparatus so that when the lens block is placed in the measuring device, it will occupy a position relative to the instrument, substantially identical to the position of the lens block relative to the abrading tool in the abrading apparatus. Means may also be provided for fixing the arms 29 so that the cylindrical axis of the lens coincides or falls on the points 16 and 18 of the plunger 14 and pins 17, respectively. To this end, a pin 33 may be inserted in a hole 34 in the base 1 and a corresponding hole in the shaft 31.

The lens block 28 may then be rocked from side to side as shown in Fig. II with its arms 32 engaged between the upright arms 29, care being taken that the lower surface of the lens A is held in contact with both of the points 18 of the pins 17 and the point 16 of the plunger 14. In this manner, the variation of the radius of curvature from one side to the other may be readily determined by observing the indicator of the measuring instrument.

By lifting the sleeve 21 above the edge of the notches 23 and rotating the same 90 degrees and allowing the notches 24 to engage the pins 26, the curvature of the lens surface may be measured in a meridian at right angles to the meridian just determined, the frame 4 being rocked forward and the centering pin 7 being lowered to engage a recess 36 in the lens block 28, through which the actuating mechanism of the abrading apparatus actuates the lens block, in order to prevent the lens block from moving sideways, thereby insuring the intersection of the two meridians, on which the lens surface is measured, being on the optical axis of the lens.

After the pin 33 has been removed from the shaft 31 and base 1, the arms 29 may be rocked forward and backward maintaining the arms 32 of the lens block in parallel planes so that the curvature of the lens A may be measured at right angles to the first meridian of measurement and across the center of the lens surface, the arms 32 being maintained substantially level by the operator. The centering pin may then be disengaged and the lens block 28 shifted in a direction of the axes of the arms 32, the latter being tilted in order to present the lens surface normal to the pins 17 and the arms 29 may again be rocked to check the curvature on the lens surface near the outer extremities of the cylindrical axis.

During the grinding of a lens surface, the lens which is secured in the holder 28 of an abrading apparatus is abraded and from time to time the holder including the lens is removed from the abrading apparatus and placed in the curve measuring apparatus to determine the trueness of the curvature in the different meridians as described above, care being taken that the position of the lens relative to its holding means is not altered during the measuring operation. If the curve in the different meridians does not conform to the prescribed curve, or if it is shown that the curvature is not constant, the abrading apparatus may be adjusted accordingly and the grinding and checking operation continued until the lenses have been reduced to the desired thickness. Since the measuring apparatus insures measurements on predetermined axes having a definite relation with respect to the positions of the lens while on the abrading apparatus, chances for errors are reduced.

It will be seen from the foregoing description that by this invention, I have provided a simple and inexpensive device adapted to be used particularly in conjunction with an abrading or grinding machine by which the abrading and grinding action may be checked from time to time and in which the lens block may be transferred directly from the grinding apparatus to the measuring apparatus for measuring the curvature of the lens along the axes on which the curves are being ground by the machine. This permits the measurement of the lens surface along the true axes of said surface and also permits the determining of the departure of said surface from true curvature at different predetermined points relative to said axes.

Having described my invention, I claim:

1. An apparatus of the type described for measuring and checking the curvatures of surfaces of lenses held in a lens block having arms, comprising a base, a curve measuring instrument carried by said base, and means carried by said base for engaging the arms of said lens holding block to maintain the axis of the lens being measured in a fixed plane relative to said lens measuring instrument while permitting free angular movement of said arms in said fixed plane.

2. An apparatus of the type described for measuring the curvature of surfaces of lenses held in a lens block having arms, comprising a curve measuring instrument, and means operably connected with said curve measuring instrument for engaging the arms of said holding block to maintain the meridian of the lens being measured in a fixed plane.

3. An apparatus of the type described for measuring the curvature of a lens blank blocked on a lens block having arms adapted to be engaged by axis fixing means on an abrading apparatus during the abrading operation, comprising a base, curve measuring means on said base, a plurality of spaced arms in a common plane and pivotally connected to said base for engaging the opposed arms of said lens block to fix the meridian in which the curve of said lens is to be checked.

4. An apparatus of the type described for measuring the curvature of a lens secured to a lens block of an abrading apparatus, comprising a base, a curve measuring device on said base, a plurality of reference points relative to which the curve of said lens is adapted to be measured, means for changing the position of said points relative to said instrument for determining the curvature of said lens in a plurality of predetermined meridians, and means carried by said base adapted to engage the arms of the lens block to hold the lens on said predetermined meridians.

5. An apparatus of the type described for measuring and checking the curvature on a lens secured to a lens block of an abrading apparatus, comprising a base, a curve measuring device on said base, an adjustable platform carried by said measuring means and having a plurality of reference points for contacting the surface of the lens being tested to determine the meridian in which the curvature of the surface is to be measured, and means carried by said base for fixing said lens and lens block against torsional movement about an axis normal to the surface of the lens while permitting otherwise free movement of the lens block.

6. An apparatus of the type described for measuring and checking the curvature of a lens surface in a direction along a predetermined meridian of the lens, comprising a base having a curve measuring instrument thereon, a block for holding the lens to be tested, and slidably connected supports on said instrument and on the block for holding the lens to be tested in aligned relation with said measuring instrument and so that the said lens and measuring instrument may be moved relative to each other in the direction along said predetermined meridian.

7. An apparatus of the type described for measuring and checking the curvature of a lens surface in a direction along a predetermined meridian of the lens, comprising a base having a curve measuring instrument thereon, lens holding means for holding the lens to be tested, and slidably connected supports on said instrument and on said means for holding the lens to be measured for supporting the said lens against torsional movement about an axis normal to the surface of said lens and so that the instrument and lens may be moved relative to each other in the direction along said predetermined meridian.

8. An apparatus of the type described for measuring the curvature of a lens secured to a lens block of an abrading apparatus, comprising curve measuring means having a rotatable support thereon and a plurality of reference points on said support relative to which the curve of said lens is adapted to be measured, said support being rotatable for changing the angular position of said points relative to said instrument for determining the curvature of said lens in a plurality of meridians while maintaining the axial relation of the curve measuring means relative to said lens.

9. An apparatus for checking the curvature of a lens attached to the lens block of an abrading apparatus in a given meridian similar to that occupied by a given axis of the abrading tools which comprises a support having a curve measuring device thereon, and adjustable means on said support having portions interfitting with portions of the lens block to adjustably maintain the said lens block and lens in a given axial position relative to the measuring device whereby said lens block and lens may be adjusted relative to said measuring device in the direction of said meridian or in a direction substantially normal thereto with substantially no torsional movement during said adjustment.

10. An apparatus of the type described for measuring the curvature being generated on a lens secured to lens holding means and by an abrading apparatus comprising a base having a curve measuring device thereon, adjustable supporting means on said base having portions interfitting with portions of the lens holding means to maintain the axis of the lens in a given meridian relative to said curve measuring device, said interfitted connection between the lens holding means and supporting means being such that the lens holding means and lens may be moved in the direction of the said given meridian of the lens relative to said lens measuring device to measure the curvature of the lens along said meridian.

11. An apparatus of the type described for measuring and checking the curvature on a lens secured to a lens block of an abrading apparatus, comprising a base, and curve measuring device on said base, lens surface contact means carried by said measuring device for determining the meridian of the lens along which the curve is to be measured, and slidably engaging bar-like means carried by said base and lens block for holding said lens with its meridian to be measuring in the direction of the line of the lens surface contact means, and for sliding movement in said direction with substantially no movement in a direction transverse to said predetermined meridian.

LLOYD W. GODDU.